United States Patent [19]

Clifton et al.

[11] Patent Number: 4,828,203

[45] Date of Patent: May 9, 1989

[54] VERTICAL/SHORT TAKE-OFF AND LANDING AIRCRAFT

[75] Inventors: Robert T. Clifton, Houston, Tex.; Woodrow L. Cook, Lake Almanor Peninsula, Calif.

[73] Assignee: Vulcan Aircraft Corporation, Houston, Tex.

[21] Appl. No.: 942,490

[22] Filed: Dec. 16, 1986

[51] Int. Cl.[4] .............................................. B64C 29/00
[52] U.S. Cl. ................................ 244/12.3; 244/23 B; 244/45 A; 244/91
[58] Field of Search ..................... 244/12.1, 12.3, 12.4, 244/23 B, 45 A, 93, 90 R, 90 A, 91

[56] References Cited

U.S. PATENT DOCUMENTS

| | | | |
|---|---|---|---|
| 1,370,041 | 3/1921 | Packard | 244/93 |
| 2,421,694 | 6/1947 | Hawkins | 244/45 A |
| 3,033,492 | 5/1962 | Rowe | 244/12.4 |
| 3,080,137 | 3/1963 | Hurel et al. | 244/12.3 |
| 3,088,695 | 5/1963 | Clark | 244/12.3 |
| 4,469,294 | 9/1984 | Clifton | 244/12.3 |

OTHER PUBLICATIONS

USMC AV-8B, McDonnel Aircraft Co. Brochure.

Primary Examiner—Galen Barefoot
Attorney, Agent, or Firm—John S. Egbert

[57] ABSTRACT

A vertical and short take-off and landing aircraft comprising a fuselage, a set canard wings, a set of lift fan wings, air deflectors, lift wings, and a pusher propeller. The canard wings are attached forward of the center of gravity to the fuselage. The lift fan wings are attached about the fuselage generally about the center of gravity of the aircraft. The lift fan wings comprise a generally circular duct extending vertically through the wing, a multi-bladed fan mounted for free rotation axially in the duct, and a prime mover connected to the fan for selectively applying rotational torque to the fan. The air deflectors are arranged about the lift fan wing in a louver-type of system for directing even flow of air to the fan. The lift wings are attached to the fuselage aft of the center of gravity of the aircraft and generally at a location vertically higher than the lift fan wings. The pusher propeller is connected to the prime mover and attached to the fuselage aft of the lift Jan wings.

20 Claims, 4 Drawing Sheets

VERTICAL/SHORT TAKE-OFF AND LANDING AIRCRAFT

TECHNICAL FIELD

The present invention relates to vertical and short take-off and landing aircraft (V/STOL). More particularly, the present invention relates to V/STOL aircraft in which ducted fans located in one set of the aircraft's wings are provided with controllable slotted housings wherein air movements from the fans may be directed for control of the aircraft while in a hovering mode or transition mode between hovering and forward flight. Also, the present invention relates to V/STOL aircraft that are powered by pusher propellers located in the rear of the aircraft.

BACKGROUND ART

Aircraft are generically divided into two major classes, fixed wing and rotating airfoil. The former are typically thought of as "airplanes", and derive their lift from the forward motion of the machine, which causes air to pass over an airfoil. Rotary winged aircraft, commonly called "helicopters", have a prime mover attached to an airfoil, which rotates. The primary drawback to conventional aircraft is that they must have rather a large area to take off and land. The principle drawback to the helicopter is that it is extremely expensive to manufacture, has little inherent control stability, and is capable of very low forward speeds, compared to an aircraft having a prime mover of the same power. The most successful short take-off and landing aircraft is the helicopter, whose rotary system produces the necessary lift. To reduce high speed vibration and drag on the rotor, stub wings are sometimes added to produce lift at forward speeds, thereby reducing load on the rotor. The results, in various configurations, are called the convertaplane. In hovering, however, the down wash of the rotor produces large loads on the wings, which compromise hovering performance.

To avoid these difficulties, several alternatives have been tried. These range from tilting the entire aircraft 90° after vertical take-off, as was done with the "Bell Pogo" aircraft, which used counter-rotating propellers on the nose of the aircraft, to tilting the power plant or wings, in combination. The same effect can be obtained by running jet engines in a horizontal position and deflecting the jet blast downward, to effect vertical thrust for take-off. When sufficient altitude has been gained, the deflection vanes are retracted and the aircraft moves in level flight. The most spectacular example of this class is the British Harrier military aircraft, which can rise vertically from area little greater than its own overall dimensions, then achieve supersonic speed in level flight. The process can be reversed for vertical landing.

All direct-lift machines known to the prior art have certain problems in common. The first is the detrimental effect of the high energy slip stream or jet striking the ground. Loose material thrown about constitutes a hazard, both to the machine and to personnel in the vicinity. Also, while the entire lifting force depends upon the engines, power failure can prove catastrophic. The greatest possible reliability in adequate emergency back-up systems is an absolute requirement in order to assure the safety of the machine and its occupants.

Because there is little or no flow over the aerodynamic control surfaces during hovering flight, entirely different types of thrust vector controls have been utilized by V/STOL's during hovering or slow forward flight. As of the early 1980's, none of these systems are entirely satisfactory.

Various V/STOL aircraft have been disclosed in the prior art. U.S. Pat. No. 3,083,935, issued to Piasecki, on Apr. 2, 1963, discloses a convertible aircraft having slidable wing members that move from one position to another position. In one position, the vertical take-off rotors are exposed to the open air. In the other position, the wing provides for aerodynamic forward flight.

U.S. Pat. No. 4,030,688, issued to Pellarini, on June 21, 1977, describes an aircraft structure having a narrow delta planform fuselage with two small-span shoulder type wings in tandem and cascade. The shape of the fuselage and its relationships with the wing provides for the vertical take-off and the forward propulsion capabilities.

U.S. Pat. No. 4,125,232, issued to MacLean et al, on Nov. 14, 1978, discloses a VTOL aircraft with fixed horizontal variable-pitched rotors. The horizontal rotor blades are arranged so as to provide vertical lift for the aircraft. A conventional jet engine is included within this aircraft to provide for horizontal flight.

U.S. Pat. No. 3,335,976 shows an aircraft, like the Ryan XV-5A, incorporating lift fans in the large relatively thick main lift wings and using clamshell shutters to close off the lift wing during forward flight. This design requires thick main wings, which create unacceptable drag during forward flight.

U.S. Pat. No. 4,194,708 teaches the use of a deflectable canard/elevator placed close to the nose tip of the aircraft, with wings mounted low and well aft on the fuselage. U.S. Pat. No. 3,618,875 teaches a V/STOL aircraft having tandem wings containing lift fans, wherein the wings provide only drag during forward flight.

The prior art teaches that, in order to maintain sufficient vertical thrust to operate a VTOL, in-the-wing fans have always necessitated the use of aircraft wings of relatively large area. This has led to the development of many designs such as that shown in U.S. Pat. No. 3,388,878, wherein fuselage mounted lift fans and gas generators lead to very complex retractable lift fan installations. It has been the object of much of the prior art of wing-mounted lift fans to minimize wing area, wing weight and general complexity, because the wings containing the lift fan were not used to provide aerodynamic lift during forward flight. For these reasons, full potential of the lift fan concept has not bee fully realized in V/STOL aircraft designs proposed to date.

U.S. Pat. No. 3,614,030 teaches a disk-like aircraft body forming an access of revolution, wherein individually controlled rotary members movable about the airflow axis control the direction of discharge of air from the ducts. U.S. Pat. No. 3,614,030, however, does not teach an aircraft using conventional aerodynamic lift, but, rather, a ground effect machine.

The present invention relates most closely and is based upon U.S. Pat. 4,469,294, issued on Sept. 4, 1984 to one of the co-inventors of the present invention. This patented device incorporates many of the features of the present invention, but it failed to achieve a truly effective configuration of the inlet and outlet vents relative to the wing fans.

Generally speaking, these, and other prior art proposals, have sought to produce V/STOL aircraft capable of obtaining the vertical flight characteristics of helicopters and the forward flight characteristics of fixed wing aircraft. Such a hybrid provides a potential solution to the air traffic problems of congestion, both in conventional airports and in land transportation to and from conventional airports. The much lower approach speeds of V/STOL aircraft can permit many more aircraft to safely occupy the airspace for multiple take-offs and landings.

It is an object of the present invention to provide a V/STOL aircraft that is relatively inexpensive to manufacture.

It is another object of the present invention to provide a V/STOL aircraft that provides reliable and stable flight.

It is another object of the present invention to provide a V/STOL aircraft that provides for optimal airflow into the lift fan system.

It is still a further object of the present invention to provide a V/STOL aircraft that provides improved fan performance and improved aerodynamic lift.

These and other objects and advantages of the present invention will become apparent from a reading of the attached specification and appended claims.

DISCLOSURE OF THE INVENTION

The present invention is a V/STOL aircraft comprising a fuselage, a set of canard wings, a set of lift fan wings, an air deflector system, a set of lift wings, and a propulsion system. The canard wings are attached to the fuselage forward of the center of gravity of the aircraft. The lift fan wings are attached to the fuselage generally about the center of gravity of the aircraft. The air deflectors are mounted about the lift fan wings for directing airflow about the wing. The lift wings are attached to the fuselage aft of the center of gravity of the aircraft. The propulsion system is a propeller attached to the fuselage aft of the lift fan wings and arranged so as to provide for forward movement of the aircraft.

The canard wings are symmetrically mounted on opposite sides of the fuselage. These canard wings include elevator members pivotally attached to the canard wings for controlling the pitch of the aircraft. The canard wings further comprise suitable controls for enabling the canard wings to cant about the longitudinal axis of the canard wings. Spoilers are pivotally mounted to the canard wings for moving outwardly from the plane of the canard wings. The controls are connected to the canard wings for actuating the movement of the spoilers.

The lift fan wings are symmetrically mounted on opposite sides of the fuselage. Each of the lift fan wings comprises a generally circular duct extending vertically through the wing, a multi-bladed fan mounted for free rotation axially in the duct, and a prime mover connected to the fan for selectively applying rotational torque to the fan.

The air deflector of the present invention comprises a plurality of fixed deflectors arranged circumferentially about the generally circular duct. These fixed deflectors direct air generally evenly about the outer edges of the fan. The fixed deflectors have an arcuate configuration with one end generally adjacent the upper portion of the duct and the other end adjacent the outer edge of the fan. The air deflector further comprises a plurality of inlet control vanes pivotally mounted about the upper opening of the circular duct. The inlet control vanes are controllably movable between a first and second position. The inlet control vanes are foil-shaped. The first position allows the inlet control vanes to mesh such that the airflow is restricted through the vanes. The second position is an open position in which the vanes direct air into the duct. Each of the inlet control vanes has a lower end pivotally mounted about the lift fan wing. The body of the inlet control vane is curved in general correspondence with the radial curvature of the lift fan wing. The inlet control vane has an upper end that is shaped so as to fit flush with the lower end of an adjacent inlet control vane. The air deflector further comprises fixed inlet vanes attached about the area of pivotal mounting of the inlet control vanes. The fixed inlet vanes are for directing airflow toward the fan. These fixed inlet vanes form a scoop in conjunction with the inlet control vanes when the inlet control vanes are in an open position. The fixed inlet vanes extend across the duct. The air deflector further comprises a plurality of outlet control vanes pivotally mounted about the lower opening of the circular duct. These outlet control vanes are controllably movable between a closed position and an open position.

The aircraft of the present invention further includes a plurality of perforated strakes attached about the bottom of the fuselage. These strakes extend outwardly from the fuselage and are aligned inboard with respect to the lift fan wing. These strakes are designed so as to direct airflow from the lift fan wings generally outward from the bottom of the aircraft.

The aircraft of the present invention further comprises a redundant prime mover having at least two engines driving a central shaft. This central shaft is connected to the propulsion system. A transmission is provided fo selectively applying the rotation of the center shaft to the fans about the lift fan wings. A second shaft transmission system is provided for selectively applying the rotation of the central shaft to the propulsion system. The engines are of the type that produce in excess of one horsepower per pound of engine weight. The engines are movable about the longitudinal axis of the aircraft for the purpose of changing the center of gravity of the aircraft. The propulsion system comprises a pusher propeller connected to the central shaft. Orthogonal working surfaces are arranged aft of the pusher propeller.

BEST MODE FOR CARRYING OUT THE INVENTION

Figure 1:
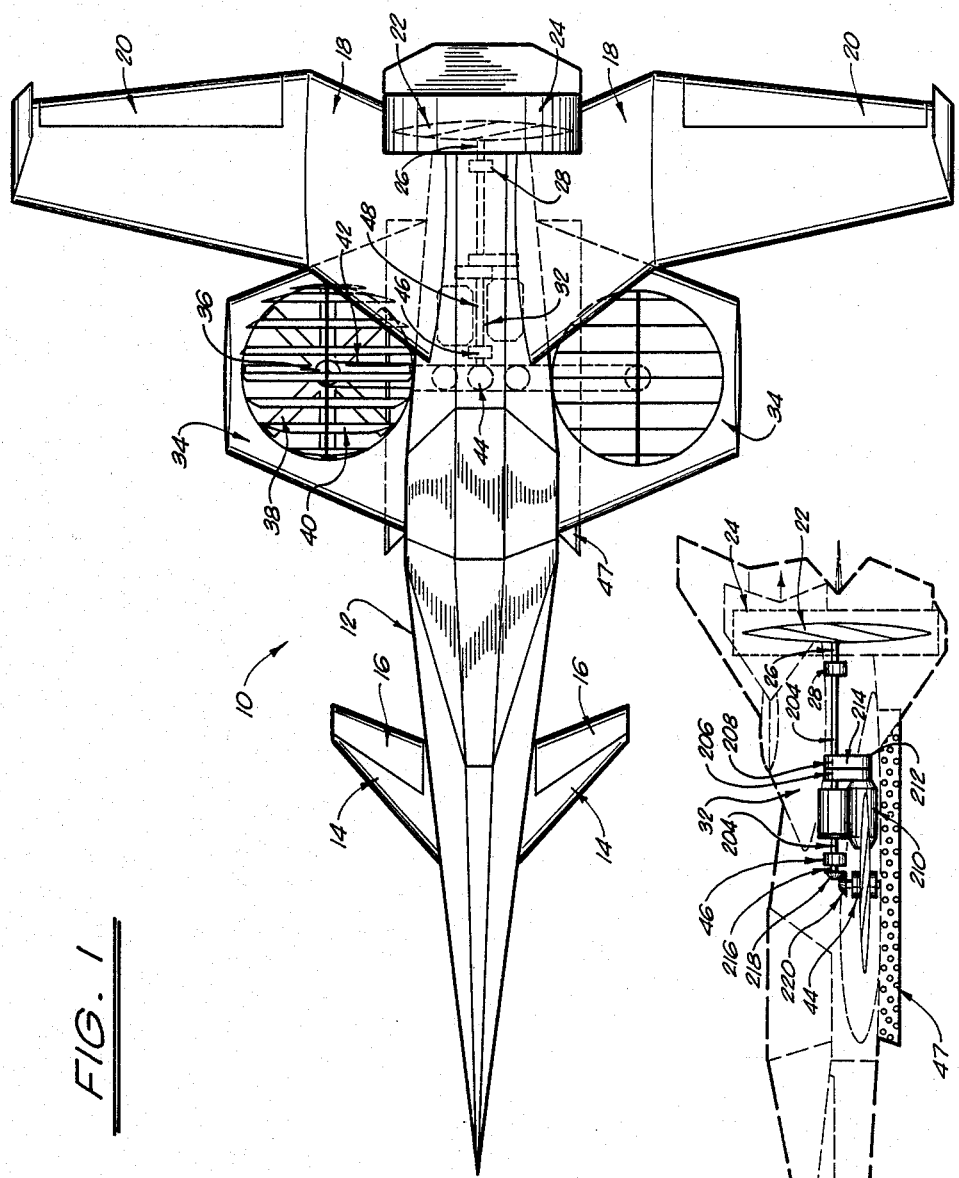
FIG. 1 is a partially cut-away top view of an aircraft constructed in accordance with the preferred embodiment of the present invention.
Figure 2:
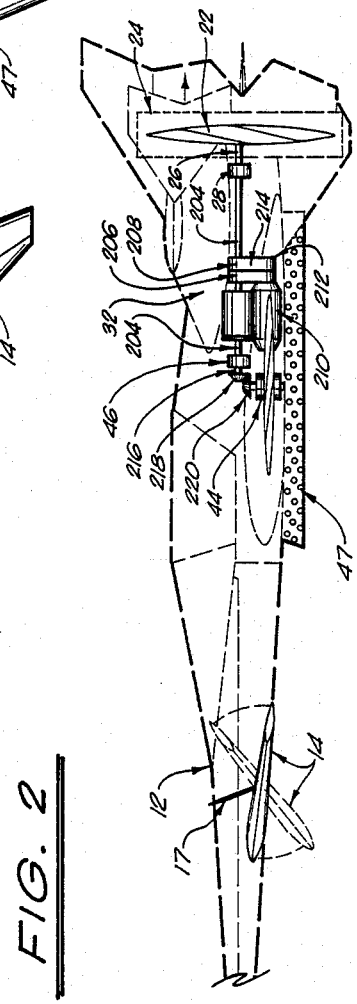
FIG. 2 is a partially cut-away side view illustrating the arrangement of the prime mover, lift fans, and pusher propeller of the preferred embodiment of the present invention.

FIG. 1 shows aircraft 10 having a fuselage 12 which is assembled from flat sheets of light but strong material, such as a rigid foam sandwich of epoxy, graphite fabric, or KEVLAR½. Fuselage 12 is essentially comprised of a foamed core material. This provides lightweight material but strong structural stability. Fuselage 12 is a forward decalage, comprising a pair of wings in a canard configuration 14. Each wing of decalage 14 has a working surface. Canards 14 are positioned symmetrically on opposite sides of fuselage 12. Canards 14 include elevator members 16 that are pivotally attached to canards 14. Suitable controls are provided to the operator of aircraft 10 for adjusting the elevators 16 of canards 14 so as to control the pitch of the aircraft. As seen in FIG. 2, canards 14 are movable between a first position, as shown in FIG. 1, and a second position, as shown in FIG. 2. The movement of canards 14 in this fashion is part of the lift-dump system of the present invention. The lift-dump system rotates the canard wings 14 rapidly to high negative incidences relative to the fuselage 12. An upper surface spoiler 17 may be deployed so as to cant upwardly. Spoiler 17 is normally maintained in a flat position about canards 14. However, in the upright position, as shown in FIG. 2, spoiler 17 interacts with the rotated position of canards 14 so as to create a down force and a stable nose-down moment of the aircraft to initiate rapid recovery from stalls.

Fuselage 12 also has a rear empennage structure 18 comprising a pair of wings having a positive dihedral. Each one of the wings 18 has an elevator or aileron 20. Wings 18 are located aft of the center of gravity of aircraft 10.

Empennage structure 18 also has a shrouded driving propeller 22 inside propeller shroud 24. A pair of orthogonal working surfaces is provided aft of propeller 22. These working surfaces, i.e., the rudder and auxiliary elevator, which are stationed behind the pusher propeller, provide positive directional and attitude control by deflection of airflow from the pusher propeller. The amount of airflow over the surfaces need only be minimal as the propeller will not produce a large amount of thrust during the hover mode of the aircraft 10.

Pusher propeller 22 is connected to shaft 26 to a clutch mechanism 28. Clutch mechanism 28 is connected by shaft 30 to prime mover assembly 32, which will be discussed in greater detail hereinafter.

Fuselage 12 is also equipped with an intermediate decalage 34, which comprises a pair of lift fan wings. Each of the lift fan wings contains a lift fan assembly 36. Lift fan assembly 36 includes a multibladed lift fan propeller 38 and a controllable slanted upper and lower air movement deflector system 40. These deflector systems 40 will be discussed hereinafter in conjunction with FIGS. 7 and 8. Lift fan wings 34 are located between canard wings 14 and rear lift wings 18. These lift fan wings are generally positioned about the center of gravity of aircraft 10.

Lift fan assembly 36 is driven by a pair of belts 42, which operably engage power transfer assembly 44, which will be described in greater detail hereinafter. Power transfer assembly 44 is connected by lift clutch 46 to shaft 48 of prime movers 32.

A perforated ground effect strake 47 is fastened to the lower portion of fuselage 12. These ground effect strakes 47 have a porosity of about 15% (depending on the fan disk loading). The strakes are about 25% of the fan diameter in width and have a length of about the length of the root chord of the lift fan wing at the conjunction point of the fuselage 12. These strakes 47 are mounted on both sides of the lower surface of fuselage 12 inboard of the lift fans 38 at an angle to the vertical. These strakes 47 divert the airflow from the fans 38 reflecting from the ground away from the fuselage. This helps to eliminate or reduce the "suck-down effect" near the ground and the resulting instability and skittish behavior experienced by present state-of-the-art V/TOL aircraft designs.

The fuselage 12 is made of material such as foamed core, KEVLAR½, or graphite cloth, impregnated with epoxy resins. The two engines of prime mover 32 are two-stroke engines producing in excess of one horsepower per pound of engine weight. One example of such an engine is the Kawasaki 550 2-cylinder engine. The present invention is not limited to any particular combination of structural materials for the airframe or prime mover for the power plant. However, the inventor believes that the best mode for carrying out the invention would encompass the use of such materials because they are lightweight and of high strength and 2-cycle reciprocating engines for the prime mover because of their high power to weight ratio.

Functionally, FIG. 1 shows a single seat version of the present invention. This particular embodiment is intended to be built and operated from minimum cost, even possibly as a kit.

Fuselage 12 is adequate in diameter for a very reclined seated individual pilot. Forward decalage 14 provides pitch control by means of moving elevators 16. Forward decalage 14 also provides for a lift-dump system in the event that both engines fail and the aft main wing stalls wherein no thrust or airflow from the aft propeller exists over the pitch control vanes. The lift-dump syste will rotate the canard 14 rapidly to high negative incidences relative to the fuselage 12 and simultaneously deploy an upper surface spoiler 17 resulting in a down force on a stable nose-down moment of the aircraft to initiate a rapid recovery from stall on the aft main wing. Lift fan wings 34 provide direct fan lift when louver system 40 is open and aerodynamic lift when louver system 40 is closed and locked, as will be described in greater detail below.

Clutches 28 and 46 provide for selectable power distribution between pusher propeller 22 and lift fans 36. Rear empennage assembly 18, including the dihedral wings, provide roll control through use of air ailerons 20 and orthogonal working surfaces aft of propeller 22. The aileron control system for the present invention can be any system known to the prior art, of which there are many. Such systems include a simple wire and pulley system, such as used on most light aircraft, or the digital fly-by-wire systems now being developed for advanced aircraft. The design of such control systems is well known to those skilled in the art of aeronautical engineering.

FIG. 2 is a dotted side view of FIG. 1, showing the power train components of the preferred embodiment of the present invention in greater detail. Throughout this specification power train components of the present invention, such as support brackets, bearings and other essential, but well known, parts of the present invention have been omitted in order to clearly show the novel structure of the present invention. The additional parts not shown are not required by the present disclosure because their design and placement would be obvious to any mechanical engineer. For example, the engines obviously must be mounted to the fuselage, but the details of such mounting do not form a material part of the present invention; thus they have been omitted in the interest of clarity. Likewise, the shafts illustrated by the present invention must be supported along their length and at their ends by bearings; these bearings must be, in turn, embedded in bearing supports, which are affixed to the fuselage. All of the details would be obvious to one of ordinary skill in the art of aeronautical engineering.

In FIG. 2, similar numbers indicate similar objects. Fuselage 12 is shown with a transparent canopy 201. After the transparent canopy, prime mover 32 is shown comprising a central shaft 204, which engages lift fan power transfer clutch 46, at its forward end, and engages pusher propeller clutch 28 at its aft end. A pair of power transfer pulleys 206 and 208 are fixed to shaft 204, medial between clutch 46 and clutch 28.

One engine 210, which is preferably a 2-cycle gasoline driven engine capable of generating more than one horsepower per pound of weight, operably engages a driven pulley 212. A slotted power transfer belt 214 drivably engages both pulley 212 and power transfer pulley 208 affixed to shaft 204. Clutch 28 selectably transfers power to propeller shaft 26, which drives pusher propeller 22 located in fan duct 24.

At the opposite end of shaft 204, clutch 46 selectively engages shaft 216, which drives bevel gear 218. Bevel gear 218 engages its complimentary orthogonal bevel gear 220 which, in turn, drives lift wing power transfer and distribution assembly 44.

Functionally, operation of prime mover 210 places an amount of torque, controllable by the pilot through adjustment of the throttle setting, on slotted pulley 212. Pulley 212 drives belt 214, which engages slotted pulley 208, which drives shaft 204. Shaft 204 drives clutch assemblies 28 and 46, which may be simultaneously or individually engaged or disengaged by the pilot. The actuator mechanism for the clutch assemblies and for the throttle have not been shown because they are well known in the art. In the preferred embodiment of the present invention, such actuator may be hydraulic or mechanical. The present inventor believes that the fullest and best use of the present invention will be obtained through the use of digital fly-by-wire techniques, using microprocessors and microcomputers. Such techniques, however, have not yet been tested; thus, they are discussed as equivalents of conventional hydraulic or mechanical techniques and are not shown in detail.

Engaging clutch 28 causes power to be transmitted through shaft 26 to drive pusher propeller 22. Pusher propeller 22 is a normal pusher propeller that mobilizes the aircraft of the present invention in its forward flight regime. Converely, engagement of clutch 46 transfers power through bevel gears 216 and 218 to power distribution and transfer assembly 44, which causes counter-rotation of the lift fans in the lift fan wings 34 and produces lift directly by mass flow of air through the lift fans. It is important that the present invention can engage either or both of these lift producing means. Coordination of transfer of power from one means to the other is necessary for transitioning the present invention to and from its stationary and forward flight regimes.

Prime mover 210 should be capable of turning in excess of 7,000 rpm and producing in excess of 100 horsepower. Belt 214 is a Uniroyal H.T.D. drive belt. Slotted pulleys 208 and 212 are hard-chromed aluminum sprockets employing one-way sprag bearings, mounted within the sprockets to allow a solid connection between the driving pulley and the drive shaft only in the direction of power rotation. This allows the drive sprocket to freewheel on the shaft and not place a load on the main drive shaft should one of the engines fail. It also allows pusher propeller 22 to freewheel during the descending glide, so that the 2-cylinder engines may idle while the propeller freewheels on the descent. Shaft sprocket 208 is approximately six inches (6") in diameter, while engine sprockets 212 are approximately three inches (3") in diameter. The diameter of pulleys 208 and 212 are in 2-2-1 ratio, because the 2-cycle engines used as prime movers in the preferred embodiment of the present invention generally turn at approximately twice the rpm necessary to drive pusher propeller 22. The belt system chosen for the present invention has been found to transmit about 98.5% of the power placed on it. Thus, the drive shaft 204 turns approximately 3500 rpm at 200 horsepower.

In FIG. 2, there is shown strake 47 attached to fuselage 12 and extending along the bottom of fuselage 12. These strakes 47 are perforated or slotted ground effect strakes and are mounted inboard of the lift fans 36. These strakes 47 divert the airflow, from the fans that reflect from the ground, away from the fuselage. This helps to eliminate or reduce the "suck-down effect" near the ground and the resulting instability and skittish behavior experienced by present state-of-the-art V/TOL aircraft designs.

Figure 3:
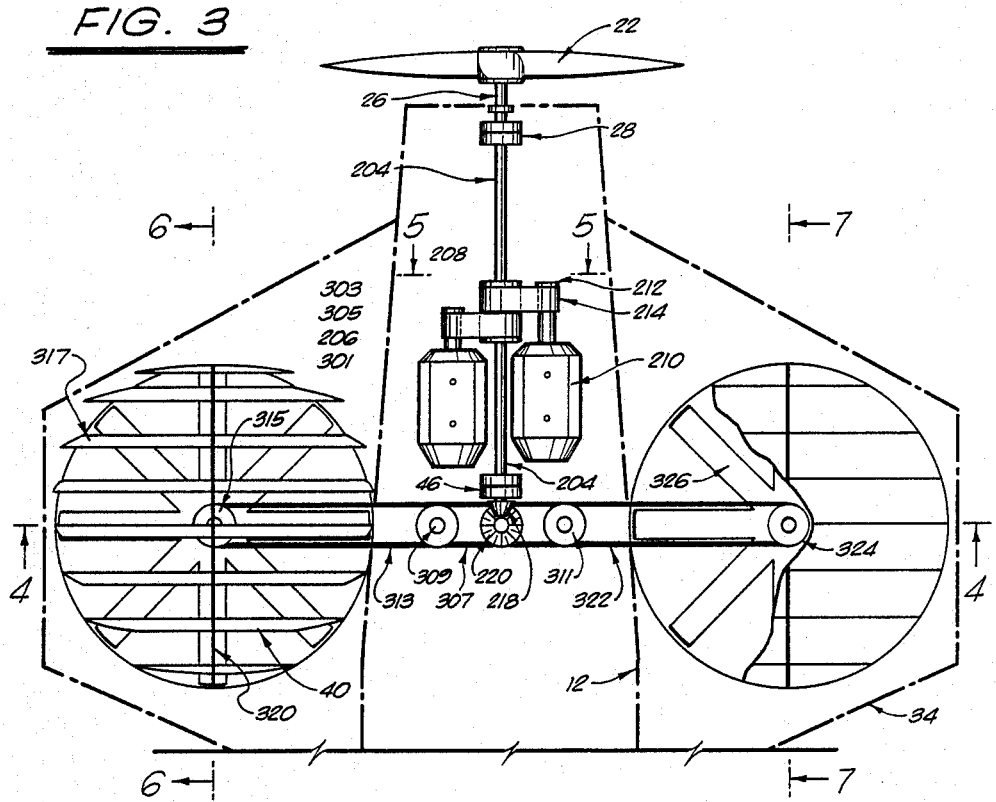
FIG. 3 is an interior mechanical view of the power plant of the present invention, shown located in the empennage of the present invention.

FIG. 3 shows a partially cut-away top view of the power train of the present invention illustrated generally in FIG. 2. In FIG. 3, similar numbers mean similar structures. Structurally, prime mover 210 and prime mover 301 are in-line mounted engines of the type described above. In keeping with the scope of the present invention, it would be possible for the engines 210 and 301 to be movable with respect to the longitudinal axis of aircraft 10. The movable-type of configuration of these engines would allow the center of gravity of the aircraft to be adjusted as need would require.

Engine 210 drives pulley 212, which engages belt 214 to drive pulley 208 on drive shaft 204. Likewise, prime mover 301 drives pulley 303, which engages belt 305 to drive pulley 206.

Drive shaft 204 engages clutches 28 and 46, as described hereinbefore. Clutch 46 drives bevel gear 218, which drives ring gear 220. Ring gear 220 drives wide lift fan driving belt assembly 307. Wide driving belt assembly 307 comprises an upper wide drive belt, a differential drive to change the direction of shaft rotation on a lower wide drive belt. The upper wide driving belt engages starboard lift fan drive capstan 309. The lower wide drive belt, which counter-rotates in relation to the upper wide drive belt, drives port lift fan idler pulley assembly 311. This assembly is described in greater detail below in connection with FIG. 4.

Starboard lift fan idler pulley 309 drives upper and lower lift fan belts 313, which engage the upper and lower drive pulley assembly 315, about the axis of starboard lift fan 317. Starboard lift fan 317 may be an eight- or nine-bladed fan.

In FIG. 3, starboard lift fan 317 is visible through a partially opened slotted vent mechanism 40, which overlies the lift fan in wing 34 and is shaped such, that when closed, it forms an airfoil section with the remainder of the wing 34. This will be discussed in greater detail hereinbelow. Multiple-slotted louver arrangement 40 is shown having a medial lateral control arm 320. This control arm is adapted to engage each of the louvers of louver assembly 40, such that they may be simultaneously opened through a range of angularly varied and speed-controlled positions. A similar louvered structure is adapted to the bottom of wing 34, below lift fan assembly 317.

Port lift fan idler assembly 311 drives upper and lower port lift belts 322, which operably engage the upper and lower pulleys on port lift drive access assembly 324. Lift fan 326 is mounted on lift fan access 324. Louver assembly 328 is shown closed on the port lift fan assembly in FIG. 3.

Figure 4:
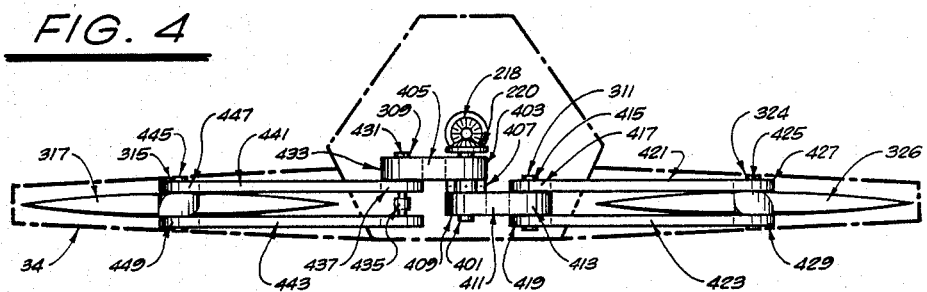
FIG. 4 is a cross-sectional view taken along lines 4—4 at FIG. 3, showing the power transmission arrangements for the lift fans of the present invention.

FIG. 4 shows a partially cut-away view along lines 4—4 of FIG. 3, illustrating the power transmission assembly. Discussion of the details of the louver assembly of the lift fans will be described hereinafter. In FIG. 4, similar numbers mean similar structures.

Structurally, ring gear 220 drives shaft 401. Just below ring gear 220 upper wide belt power transmission pulley 403 engages upper drive belt 405. Just below pulley 403, a differential drive 407 reverses the direction of pulley rotation, such that the lower wide belt pulley 409, which operably engages lower wide drive belt 411, is in counter-rotation to pulley 403. Lower wide drive belt 411 engages medial pulley 413 of port lift fan assembly 311.

Idler pulley assembly 311 has a shaft 415, with driven pulley 413 medially disposed between upper lift fan driver pulley 417 and lower port lift fan driver pulley 419. Upper port lift fan driver 417 engages upper port fan drive belt 421 and lower lift fan belt driver pulley 419 engages lower lift fan drive belt 423. Port lift fan drive access assembly 324 comprises a central shaft 425, upon which is rotationally mounted lift fan 326. Lift fan 326 is mounted medially on axis 425, between upper port lift fan drive pulley 427, which engages upper belt 421, and lower driven port lift fan pulley 429, which is driven by operably engaging lower drive belt 423.

Starboard idler lift fan power transferral assembly 309 comprises a central shaft 431, a starboard wide driven pulley 433, which operably engages upper wide starboard drive belt 405 and a bearing block 435 mounted medially between upper starboard drive belt pulley 437 and lower starboard drive belt pulley 439.

Upper starboard drive belt pulley 437 drives upper starboard lift fan drive belt 441, while lower starboard lift fan drive pulley 439 engages and drives lower starboard lift fan drive belt 443. Lift fan access assembly 315 comprises a central shaft 445 rotationally engaging starboard lift fan 317. Starboard lift fan 317 is medially disposed between upper starboard lift fan drive belt 447, which operably engages upper belt 441 and lower starboard lift fan driven pulley 449, which is driven by and operably engages lower belt 443.

Functionally, shaft 401 is the primary fan shaft and sprockets 403 and 409 are six inch (6") diameter, three inch (3") wide sprockets. These three-inch (3") wide primary fan sprockets drive three-inch (3") wide primary fan belts, which are H.T.D. belts capable of handling in excess of seventy-five (75) horsepower. Secondary fan sprocket assemblies 309 and 311 are driven by these primary fan belts and, in turn, drive the secondary fan belts 441, 443, 421, and 423, which drive the lift fans. The reason for having two fan belts is to provide safety by means of a redundant drive system in the wing, where abrasion could cause fatigue or damage to the secondary driving belt. The secondary fan belts 441, 443, 421, and 423, are housed in protective sleeves, not shown, to protect them from wind vibration and possible jamming. Each belt is capable of handling a seventy-five (75) horsepower load, which will fully operate either of the lift fans. The lift fans themselves are eight (8) or nine (9) bladed, and turn in the neighborhood of 350 rpm, to produce five hundred (500) pounds of vertical lift each.

It should be noted that the two lift fans are driven in counter-rotation to cancel torque loads on the air frame, and their angular velocity is synchronized to prevent uneven load distribution occurring between the fans.

Figure 5:
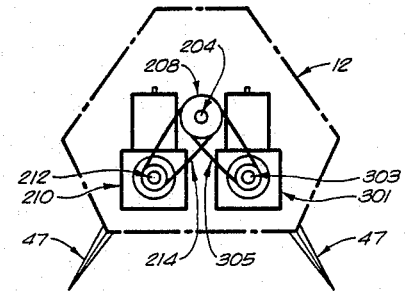
FIG. 5 is a view taken along section 5—5 of FIG. 3, showing the belt drive arrangement for the dual prime movers of the present invention.

FIG. 5 illustrates, in detail, the power transmission portion of the prime mover of the present invention. FIG. 5 shows, in particular, the perforated ground effect strakes 47. These ground effect strakes 47 have a porosity of about 15% (depending on fan disk loading). The strakes 47 are about 25% of the fan diameter in width and have a length of about the length of the root chord of the lift fan wing at the junction point of the fuselage.

Figure 6:
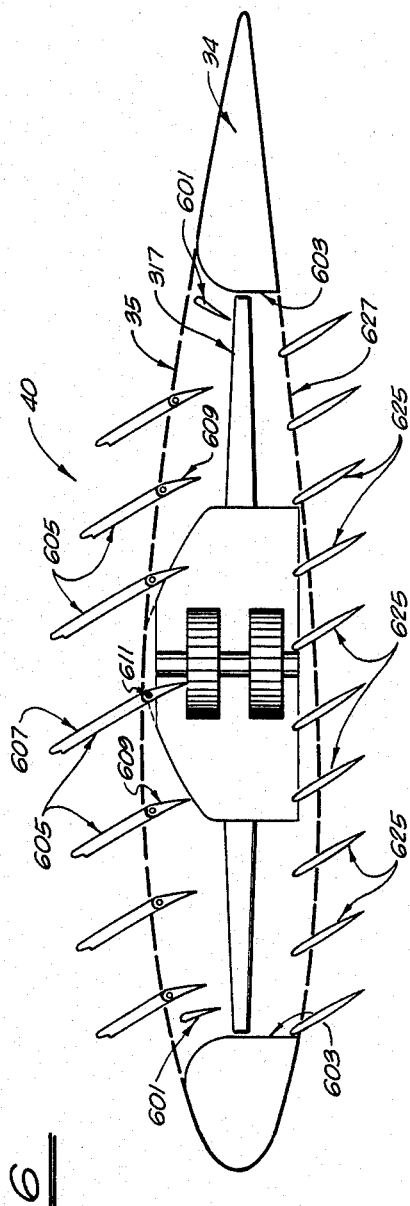
FIG. 6 is a cross-sectional view showing the arrangement of air deflectors within the lift fan of the present invention. The air deflectors are shown in their "open" position.

FIG. 6 is a cross-sectional view illustrating the lift fan wing 34 with louver assembly 40 opened. In this configuration, lift fan 317 can provide direct lift by moving air from the top of wing 34, through the wing, and out through the bottom of the wing. Structurally, wing 34 is provided with lift fan opening 35, which is covered by a movable louver system 40.

Movable louver system 40 comprises a plurality of fixed deflectors 601. These fixed deflectors 601 are arranged circumferentially about the generally circular duct 603 of lift fan wing 34. These fixed deflectors 601 are positioned so as to direct air generally evenly about the outer edges of fan 317. These fixed deflectors 601 serve to equalize the load about the periphery of fan 317. This helps to eliminate oscillations and potential failure and breakdown in the fan system. These fixed deflectors have an arcuate configuration having one end generally adjacent the upper portion of duct 603 and the other end adjacent the outer edge of fan 317.

A plurality of inlet control vanes 605 are pivotally mounted about the upper opening of circular ducts 603. Specifically, these vanes 605 may be pivotally mounted to the wing surface at the edges adjacent the duct 603. These vanes 605 may be hydraulically or pneumatically actuated so as to provide some control on the position and location of vanes 605. These inlet control vanes 605 are airfoil shaped. These vanes 605 have a contour about side 607 that generally corresponds to the radial curvature of the lift fan wing 34. These vanes 605 are aerodynamically shaped airfoils having the trailing edge portions 609 fixed at a predetermined angle relative to the fan vertical axis and the forward portion 605 movable through a range of angles from near vertical at hover to specific angles as a function of air speed and fan disk loading. The inlet control vanes 605 provide proper turning of the airflow with forward speed to prevent any fan blade stall and consequent loss of performance and catastrophic failure of the fan blades. The aerodynamically shaped upper surface 607 of vanes 605 provide an aerodynamic lift force that increases with forward speed during transition. This provides a significant increase in total lift force. In this manner, the inlet control vanes 605 can provide optimum loading of fan 317 during the various phases of hover and flight of the present aircraft. The lower portion 609 is fixed at pivot point 611. The upper portion 607 is angularly movable about pivot point 611.

Figure 7:
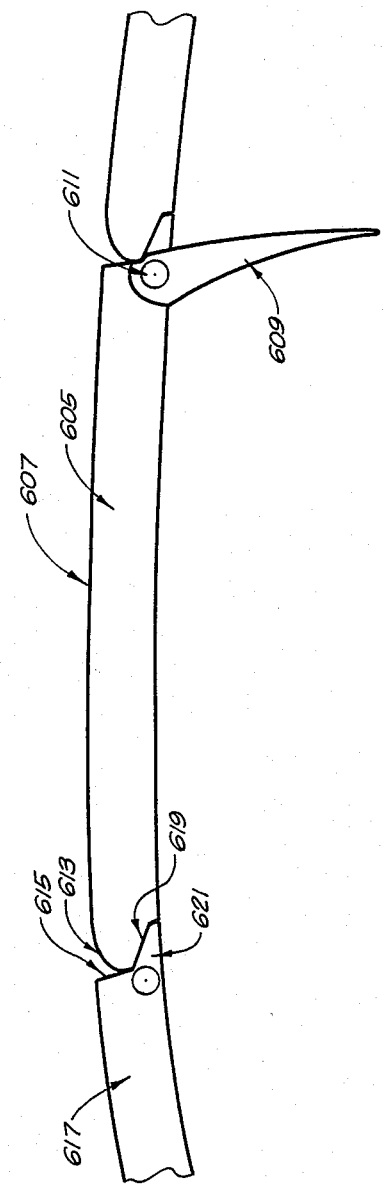
FIG. 7 is a close-up view of the air deflectors at the top of the lift fan wing showing the air deflectors in their "closed" position.

The inlet control vanes 605 are movable between a first, or "open", position (as shown in FIG. 6) and a second, or "closed", position (as shown in FIG. 7). In the closed position, the upper surface 607 of inlet control vanes 605 shows a curvature generally corresponding to the radial curvature of the wing 34. The end 613 of vanes 605 meshes with the bottom end 615 of adjacent vanes 617. The upper end 613 of vanes 605 includes an indented portion 619 that meshes and fits flush with tab 621 about the bottom portion 615 of vanes 617. In this closed position, air is restricted from entering circular duct 603 of wing 34. Also, in this configuration, air is prevented from entering circular duct 603 across the upper surface of wing 34. As shown in FIG. 7, the lower end 609 of vanes 605 is in fixed position within circular duct 603. In other words, lower portion 609 is fixedly connected to pivot point 611. Lower portion 609 is designed to direct air uniformly onto the fan 317.

A plurality of outlet control vanes are pivotally mounted about the lower opening 627 of circular duct 603 of wing 34. These outlet control vanes are controllably movable between a closed position and an open position (as shown in FIG. 6). These outlet control vanes are airfoil shaped and close together in the manner shown in FIG. 7.

The configuration of the louver system 40 of the present invention is an important aspect of the present invention. The louver system closes forward in order to provide the necessary airflow for the intake of the lift fans. As the aircraft 10 begins to move forward, the air must be directed to the fan, or the cross-flow of the air will cause the fan to stall. The arrangement of the louver system spreads the airflow about the fan 317 in a manner that eliminates fan blade oscillation. Additional lift is provided to aircraft 10 by the induced airflow ove the louver foils 605. This foil-shape of the vanes 605 also serves to increase the efficiency of the fan system. The outlet control vanes 625 are arranged to open and close so as to assist in providing forward thrust to the aircraft 10. Once again, the outlet control vanes 625 are foil-shaped to assist in the aerodynamic characteristics of the aircraft of the present invention. Additionally, as air is induced to accelerate over the foiled curved surfaces, the foilshaped louvers help to produce lift and thereby add to the efficiency of the lift fan system of the present invention. The angle of movement of the upper vanes 605, and size of the vanes, will vary in accordance with the proper distribution of airflow to the fan.

The outlet control vanes 625 serve to direct the exiting airflow slightly rearward in order to provide forward thrust for the aircraft. In addition, these outlet control vanes 625 close so as to provide a smooth and aerodynamic configuration of fan wing 34.

Functionally, FIGS. 6 and 7 illustrate the means by which the present invention directs the flow of air to the lift fan wing 34 during take-off and landing and provides forward and reverse thrust during transition from the present invention's forward flight regime to its hovering take-off or landing regime. Initially, during take-off, the inlet and outlet control vanes are placed in their "open" position. Air is directed through the inlet vanes 605, through the fan 317, and out by way of the outlet control vanes 625. This provides downward thrust to the aircraft 10 of the present invention and allows the aircraft to lift from the ground. As forward momentum is provided by means of the pusher propeller of the present invention, the inlet control vanes 605 act to "scoop" in air aerodynamically into the fan system. This provides a ram-like effect so as to increase the efficiency of the lift fans during take-off and transition. When the aircraft 10 has achieved the altitude desired, the louver systems are locked closed in the manner illustrated in FIG. 7. The fans may be disengaged by the lift fan clutch such that forward momentum is provided by the pusher propeller 22.

The louver system of the two lift fans showing in the preferred embodiment of the present invention may be synchronized during transition to or from a forward flight regime, or they may be controlled individually to provide yawing movements about the center of gravity of the aircraft.

One other major operating component of the aircraft 10 is that during the transition, to or from hover, the main wing and canard wing continue to provide lift by normal means, even at slow speeds. That is to say, from hover as the craft moves forward in slow flight, the main wings and canards begin to lift the craft very early in forward flight. Also, as the craft slows from forward flight to hover, the main wings and canards continue their lifting function until the lift fans achieve vertical lift velocity. It is the combination of lifting fans and lifting wings that augment one another through their respective flight regimes, in this type of configured aircraft.

Figure 8:
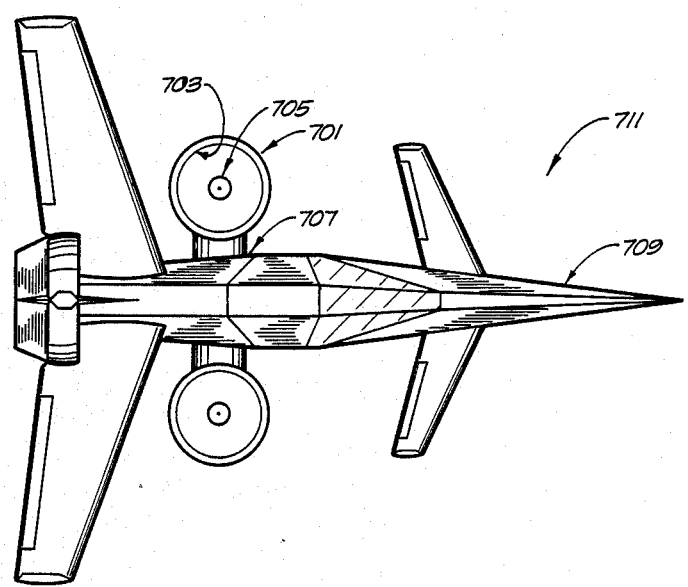
FIG. 8 is a top view showing an alternative embodiment of the V/STOL aircraft of the present invention.
Figure 9:
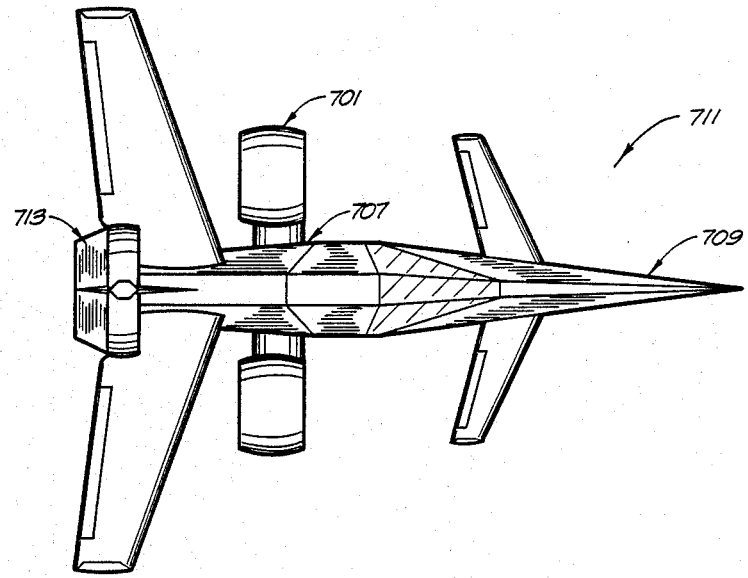
FIG. 9 is a top plan view of the alternative embodiment of FIG. 8 showing the lift members in an alternative position.

FIGS. 8 and 9 illustrate an alternative embodiment to the present invention. Specifically, FIG. 8 shows the lift fan wing 34 with a generally circular configuration. Specifically, lift fan wing 701 has a generally circular outer diameter. A circular duct 703 extends through the wing 701. A multi-bladed fan 705 is provided so as to rotate within circular duct 703. The manner providing rotation of fan 705 has been described extensively hereinbefore. Circular wing 701 is rotatably mounted at 707 to fuselage 709 of aircraft 711. It is the rotatable mounting of wing 701 to aircraft 711 that is the unique aspect of this alternative embodiment of the present invention. Wing 701 is rotatable from the longitudinally vertical position shown in FIG. 8 to the longitudinally horizontal position shown in FIG. 9.

It is the rotation capability of the wing 701 of FIGS. 8 and 9 that is the unique aspect of this embodiment of the present invention. Specifically, during the take-off mode, the circular wing 701 is in the longitudinally vertical position of FIG. 8. This provides the downward thrust vector that is required for take-off of aircraft 711.

FIG. 9 illustrates the longitudinally horizontal position of wing 701 during the forward flight mode of aircraft 711. This allows the fans to produce a rearward thrust vector so as to assist in the forward motion of aircraft 711. Further propulsion is provided by means of the pusher propeller 713.

During the transition from vertical take-off to forward movement, aircraft 711 gradually rotates wing 701 between its two positions. During this transition mode, the fan 705 of wing 701 will produce a somewhat downward and a somewhat rearward thrust vector. As a result, the aircraft 711 is able to achieve forward and upward moving flight during the transition period.

Other than the configuration of wing 701, aircraft 711 is of a similar design as that described herein previously. The means for rotating wing 701 about point 707 can be provided by suitable gearing means connected to the prime movers as described hereinbefore. Similarly, alternative systems for rotating wing 701 are known and can be provided by the prior art.

Although the inventor has described a specific embodiment of the present invention in the present specifications, that embodiment is given as illustration of the best mode only and should not limit the scope of the present invention. Many modifications of the present invention can be made within the scope of the present invention. The present invention should, therefore, be limited only by the appended claims and their legal equivalents.

I claim:

1. An aircraft comprising:
   a fuselage;
   a set of canard wings attached to said fuselage forward of the center of gravity of said aircraft;
   a set of lift fan wings attached to said fuselage generally about the center of gravity of said aircraft;
   air deflector means mounted about said lift fan wings for directing airflow about said wing;
   a set of lift wings attached to said fuselage aft of the center of gravity of said aircraft;
   propulsion means attached to said fuselage aft of said lift fan wings for providing forward movement of said aircraft; and
   a plurality of perforated strakes attached about the bottom of said fuselage, said strakes extending outwardly from said fuselage, said strakes generally aligned about said lift fan wings.

2. The aircraft of claim 1, said canard wings being symmetrically mounted on opposite sides of said fuselage, said canard wings including elevator members pivotally attached thereto for controlling the pitch of said aircraft.

3. The aircraft of claim 2, further comprising control means for said canard wings for enabling said canard wings to cant about the longitudinal axis of said canard wings.

4. The aircraft of claim 1, said lift fan wings being symmetrically mounted on opposite sides of said fuselage, each of said lift fan wings comprising:
   a generally circular duct extending vertically through said wings;
   a multi-bladed fan mounted for free rotation axially in said duct; and
   prime mover means connected to said fan for selectively applying rotational torque to said fan.

5. The aircraft of claim 4, said air deflector means comprising:
   a plurality of fixed deflectors arranged circumferentially about said generally circular duct, said fixed deflectors for directing air generally evenly about the outer edges of said fan.

6. The aircraft of claim 5, said fixed deflectors having an arcuate configuration with one end generally adjacent the upper portion of said duct and with the other end adjacent to the outer edge of said fan.

7. The aircraft of claim 4, said air deflector means comprising:
   a plurality of inlet control vanes pivotally mounted about the upper opening of said circular duct, said inlet control vanes controllably movable between a first position and a second position.

8. The aircraft of claim 7, said inlet control vanes being foil-shaped, said first position allowing said inlet control vanes to mesh such that airflow is restricted to said vanes, said second position being an open position in which said vanes direct air toward said fan in said duct.

9. The aircraft of claim 8, each of said inlet control vanes having a lower end pivotally mounted to said lift fan wing, the body of said inlet control vanes being curved so as to generally correspond with the radial curvature of said lift fan wing, said inlet control vanes having an upper end that is shaped so as to fit flush with the lower end of an adjacent inlet control vane.

10. The aircraft of claim 7, said air deflector means further comprising:
    fixed inlet vanes attached about the area of pivotal mounting of said inlet control vanes, said fixed inlet vanes for directing airflow toward said fan, said fixed inlet vanes forming a scoop in conjunction with said inlet control vane when said inlet control vanes are in an open position, said fixed inlet vanes extending across said duct.

11. The aircraft of claim 7, further comprising:
    a plurality of outlet control vanes pivotally mounted about the lower opening of said circular duct, said outlet control vanes controllably movable between a closed position and an open position.

12. The aircraft of claim 4, further comprising:
    a redundant prime mover comprising at least two engines driving a central shaft, said central shaft connected to said propulsion means;
    means for selectively applying the rotation of said central shaft to said fan; and
    second shaft transmission means for selectively applying rotation of said central shaft to said propulsion means.

13. The aircraft of claim 12, said engines being of the type that produce in excess of one horsepower per pound of engine weight.

14. The aircraft of claim 12, said propulsion means comprising a pusher propeller, said pusher propeller connected to said central shaft.

15. The aircraft of claim 14, said propulsion means further comprising:
    orthogonal working surfaces arranged aft of said pusher propeller.

16. The aircraft of claim 1, said lift wings having ailerons pivotally connected thereto.

17. The aircraft of claim 1, said fuselage being composed of foamed core material.

18. The aircraft of claim 1, each of said lift fan wings comprising:
    a generally circular member rotatably mounted to said fuselage;
    a generally circular duct extending vertically through said member;
    a multi-bladed fan mounted for free rotation axially in said duct;
    prime mover means connected to said fan for selectively applying rotational torque to said fan; and actuation means connected to said member for selectively rotating said member relative to said fuselage.

19. The aircraft of claim 18, said member being rotatable between a position in which the axis of said duct is vertical and a position in which said axis is horizontal relative to the earth.

20. An aircraft comprising:
a fuselage;
a set of canard wings attached to said fuselage forward of the center of gravity of said aircraft;
a set of lift fan wings attached to said fuselage generally about the center of gravity of said aircraft, said lift fan wings being symmetrically mounted on opposite sides of said fuselage, each of said lift fan wings comprising:
  a generally circular duct extending vertically through said wings;
  a multi-bladed fan mounted for free rotation axially in said duct; and
  prime mover means connected to said fan for selectively applying rotational torque to said fan;
air deflector means mounted about said lift fan wings for directing airflow about said wing, said air deflector means comprising:
  a plurality of inlet control vanes pivotally mounted about the upper opening of said circular duct, said inlet control vanes controllably movable between a first position and a second position, said inlet control vanes being foil-shaped, said first position allowing said inlet control vanes to mesh such that airflow is restricted to said vanes, said second position being an open position in which said vanes direct air toward said fan in said duct, each of said inlet control vanes having a lower end pivotally mounted to said lift fan wing, the body of said inlet control vanes being curved so as to generally correspond with the radial curvature of said lift fan wing, said inlet control vanes having an upper end that is shaped so as to fit flush with the lower end of an adjacent inlet control vane; and
  fixed inlet vanes attached about the area of pivotal mounting of said inlet control vanes, said fixed inlet vanes for directing airflow toward said fan, said fixed inlet vanes forming a scoop in conjunction with said inlet control vanes when said inlet control vanes are in an open position, said fixed inlet vanes extending across said duct;
a set of lift wings attached to said fuselage aft of the center of gravity of said aircraft; and
propulsion means attached to said fuselage aft of said lift fan wings for providing forward movement of said aircraft.

* * * * *